United States Patent [19]

Ming-Luen

[11] Patent Number: 5,030,178
[45] Date of Patent: Jul. 9, 1991

[54] POWER DIVIDING STEPLESS SPEED CHANGE TRANSMISSION SYSTEM

[76] Inventor: Law Ming-Luen, Flat 4, Fl. 6, Block E Ka Tin Court, Sha Tin, Hong Kong

[21] Appl. No.: 261,789

[22] Filed: Oct. 24, 1988

[30] Foreign Application Priority Data

Nov. 3, 1987 [CN] China .................................. 8710766

[51] Int. Cl.$^5$ ................................................ F16H 47/08
[52] U.S. Cl. ........................................ 475/36; 475/73
[58] Field of Search ........................... 74/688, 687, 691

[56] References Cited

U.S. PATENT DOCUMENTS

| | | | |
|---|---|---|---|
| 2,251,170 | 7/1941 | Seybold | 74/688 |
| 2,312,105 | 1/1943 | Liebrecht | 74/691 |
| 2,924,992 | 2/1960 | Edsall | 74/688 |
| 3,078,739 | 2/1963 | Weinrich | 74/688 X |
| 3,435,707 | 4/1969 | De Julian | 74/688 X |
| 3,924,489 | 12/1975 | Yasuda | 74/688 |
| 3,982,448 | 9/1976 | Polak et al. | 74/687 |
| 4,120,213 | 10/1978 | Levy | 74/688 |
| 4,819,509 | 4/1989 | Rohne et al. | 74/688 |

*Primary Examiner*—Dirk Wright
*Attorney, Agent, or Firm*—Blakely, Sokoloff, Taylor & Zafman

[57] ABSTRACT

The power dividing stepless speed change transmission system has no less than two power dividing zero points of different nonzero finite values whereat the drives is in the same direction. The system, to a great extent, reduces the branch power, thereby improving the efficiency of the power dividing transmission system expanding speed change range in high efficiency thereof. Examples listed comprise a system with a speed regulating device having two adjusted parts, a system with wheel train, a system with the wheel trains serially connected, a system of serially connected power dividing system and systems separately using a mechanical stepless speed change device, a hydraulic transmission device and a hydrodynamic torque converter as speed regulating devices.

8 Claims, 5 Drawing Sheets

POWER DIVIDING STEPLESS SPEED CHANGE TRANSMISSION SYSTEM

BACKGROUND OF THE INVENTION

1. Field of the Invention

This invention relates to a power dividing transmission system adapted to transmit mechanical power in a stepless speed change manner. Said system comprises a driving part; a driven part; at least one stepless speed change transmission device adapted to vary the speed ratio of said system and a mechanism with degree of freedom greater than one, called Multi-freedom mechanism, having moving parts respectively connected to said driving part, driven part and the drive parts of said device.

The degree of freedom of the transmission system as described herein is the freedom when the frame thereof is in fixed state.

In the present invention, where it is mentioned that two moving parts are connected means that there is a fixed speed ratio between the two parts e.g., two shafts are coupled together or one gear is engaged to another.

The speed ratio of a transmission system in the present invention is the kinetic parameter ratio of the driving part to the driven part of the said system, i.e.

$$i_{12} = n_1/n_2$$

where $i_{12}$ is the speed ratio of the so said system, $n_1$ is the angular displacement or rotating speed of the driving part, and $n_2$ is the kinetic parameter of the driven part, in the same unit as $n_1$.

2. Description of the Prior Art

In the aforesaid system, any said stepless speed change device that the change of speed ratio thereof will vary the speed ratio of the system is called a regulating device of the system, and the moving parts of the multi-freedom mechanism connected to said regulating device are called adjusted parts of said device.

In operation, the power is transmitted through not only said multi-freedom mechanism but also through the said regulating device. The power transmitted by said regulating device is called branch power.

Generally, the multi-freedom mechanism of a transmission system employs a gear train comprising epicyclic gear trains or other similar differential mechanism. The speed regulating device of said system may be a hydrodynamic torque converter, fluid coupling magnetic slip clutch, frictional stepless speed change device, hydraulic stepless speed change device or combination composed of any aforesaid device and other mechanisms.

Usually, the efficiency of the multi-freedom mechanism is very high and the life of service longer, while the efficiency of the speed regulating device is lower and life of service shorter. With more branch power, the transmission system requires a regulatinq device with greater capacity and the performance of such transmission system deteriorates. Accordingly, one area of improvement for existing power dividing stepless speed change transmissions is the reduction of its branch power.

SUMMARY OF THE INVENTION

The object of this invention is to set forth a new type of power dividing transmission system operating in a certain speed ratio range requiring less branch power. The objective of the invention is attained by utilizing a characteristic of a special power flow passage in the transmission system.

If the drive parts of the speed regulating device in the transmission system are respectively connected to two reciprocally independent adjusted parts in the multi-freedom mechanism, the speed regulating device becomes one branch power passage with two ends. Whenever one of the adjusted parts is in a static state, the power flow through the passage will be stopped. Accordingly, the speed ratio of said system with any one of the adjusted parts of the regulating device being static is called power dividing zero point in the speed ratio coverage of said system. Obviously, for any regulating device as aforesaid having a branch power passage with "two ends", there are two power dividing zero points of the system corresponding to its two adjusted parts respectively.

While the device is singly acting as the regulating device for the system, i.e., the speed ratio of each of the other stepless speed change devices is remaining unchanged, the values of said two power dividing zero points are fixed and attributed to the structure of the multi freedom mechanism of the system. Theoretically, as a speed ratio, the power dividing zero point may be zero, infinity or any real number. An "input-split transmission" is an example of the system wherein one power dividing zero point is infinity; and an "output split transmission" is the example of the system wherein one said power dividing zero point is zero.

For the aforesaid system with negligible mechanical loss, it has been proved that, if the regulating device is acting singly, the two power dividing zero points are non-zero, finite, different and in a same drive direction, while the system is working in a speed ratio range bounded by said two zero points, the relative branch power, i.e., the ratio of the power transmitted by said regulating device to the power transmitted by the system, will vary between zero and a high value, which can be approximately estimated according to the following formula $$P_e = \frac{P_d}{P_s} = \frac{\sqrt{R-1}}{\sqrt{R+1}}$$

$P_e$—the extreme value of the relative branch power $P_d$—the power transmitted by the branch power passage $P_s$—the power transmitted by the transmission system where $$R = \frac{i_2}{i_1}$$

$i_1, i_2$—the power dividing zero points

According to the above formula, $P_e$ is always less than 1 and the narrower speed ratio range correlates to smaller relative branch power. Thus, according to the speed regulating condition and working in the speed ratio range, the transmission system of this invention having said "two end power passage" can reduce its relative branch power. For example, as far as a system with only negligible mechanical loss is concerned, in a transmission system with two power dividing zero points in a same drive direction where $i_1 = 1.5$ and $i_2 = 4.5$, the extreme relative branch power in the speed ratio requlating range between $i_1$ and $i_2$ is 27%; comparatively, a known input split transmission system, in which a drive part of the regulating device is connected to the driven part of the system and the other drive part is connected to the adjusted part corresponding to the power dividing zero point $i_2 = 4.5$, and with system working in the speed ratio range from 1.5 to 4.5, its maximum relative branch power will be 67%.

Furthermore, another object of this invention is to enlarge its appropriate speed ratio regulating range by serially connecting the present invented stepless speed change transmission system to another power dividing stepless speed change transmission system.

DETAILED DESCRIPTION OF THE PREFERRED EMBODIMENTS

Figure 1:
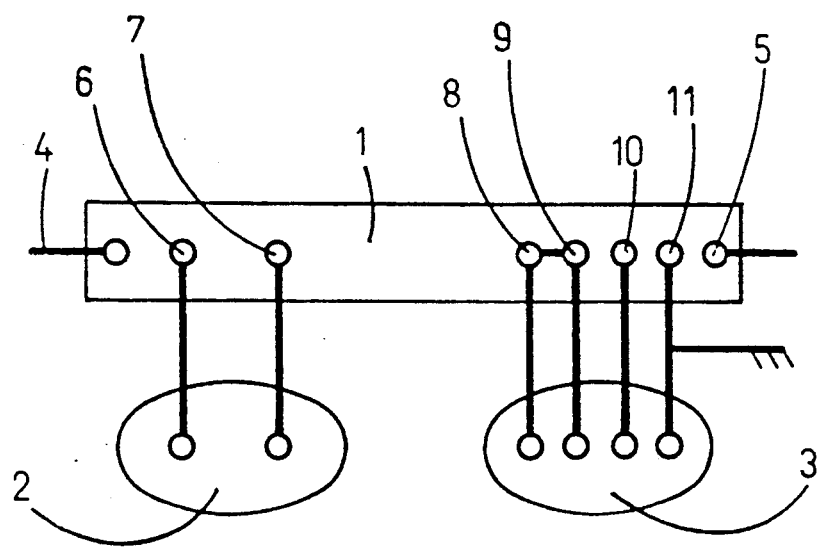
FIG. 1, FIG. 2 and FIG. 3 depict basic arrangements of the transmission system of the invention.
Figure 2:
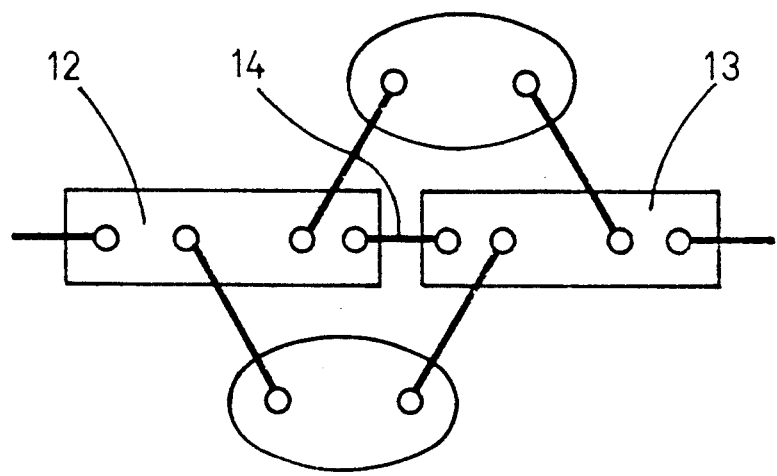

Referring to FIG. 1, a typical power dividing transmission system, including a multi-freedom mechanism (1) and stepless speed change transmission devices (2), (3), etc. is shown. FIG. 1 also shows the driving part (4) of the system and the driven part (5). The stepless speed change devices have moving parts connected to parts (6), (7), (8), (9), (10), (11) and so on in the multi-freedom mechanism, and each of said devices individually has at least 2 drive parts connected to the multi-freedom mechanism, thereby each of said devices becomes a branch power passage out of the multi-freedom mechanism (1). If each stepless speed change device maintains the respective speed ratio of the drive parts thereof unchanged, the degree of freedom of the whole transmission system will be 1. If the speed ratio between moving parts of the stepless speed change device (2) or (3) is changed, the ratio of the transmission system will change correspondingly, and the devices (2) and (3) will become the speed regulating devices of the transmission system.

As shown in FIG. 1, a power dividing transmission system of the present invention includes a speed regulating device (2), of which the adjusted parts (6), (7) are independent to each other and also independent with respect to driving and driven parts (4) and (5). The relative independence of a certain element from the other in the multi-freedom mechanism means that, when the multi-freedom mechanism is in an isolated free state, except that its frame is fixed, if one of the said elements is fixed, the other one will still be free to move.

When the speed regulating device (2) is singly acting as the speed regulating device for the system and the parts (6) and (7) are respectively in static states, the speed ratios of the system correspondingly are $i_6$ and $i_7$, where $i_6$ and $i_7$ are different non-zero finite values and are in a same drive direction. When elements (6) or (7) are in a static condition separately, the power flow inside the speed regulating device (2) is cut off. Therefore, $i_6$ and $i_7$ are said power dividing zero points of the speed regulating device (2) separately corresponding to the adjusted parts (6) and (7).

For the speed regulating device (3) in the multi-freedom mechanism, there are more than two moving parts, i.e., (8), (9), (10, (11) connected to the device. Except for the two parts (9) and (10), during operation of the transmission system, the other moving parts either are braked, such as (11), or connected to one of the aforesaid two moving parts, such as (8). Device (3) is also a branch power passage with two ends, and has two power dividing zero points corresponding to parts (9) and (10) respectively. In the present invention, the transmission system also comprises a regulating device such as (3) and of which the corresponding power dividing zero points are two different nonzero finite values in a same drive direction.

Figure 3:
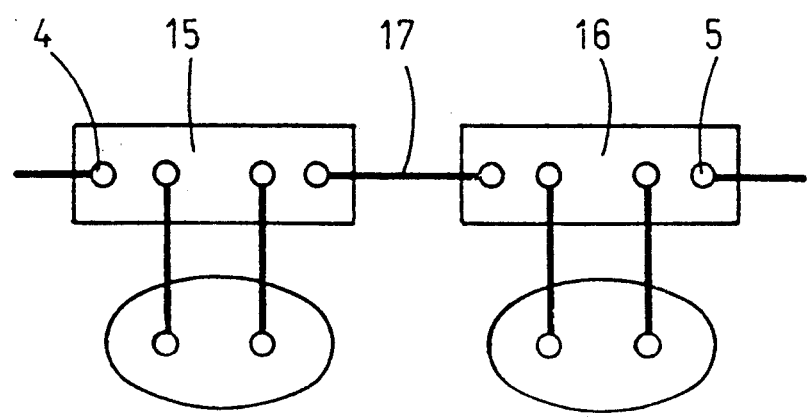

FIG. 3 also shows another embodiment of a transmission system covered by the invention. This transmission system includes two serially connected power dividing transmission systems (15) and (16), where a,t least one transmission system (15), (16) is described herein. There is only one connection (17) between the two serially connected transmission systems (15) and (16), shown in FIG. 3, i.e., the connection between the driven part of the transmission system (15) and the driving part of the other transmission system (16).

Figure 4:
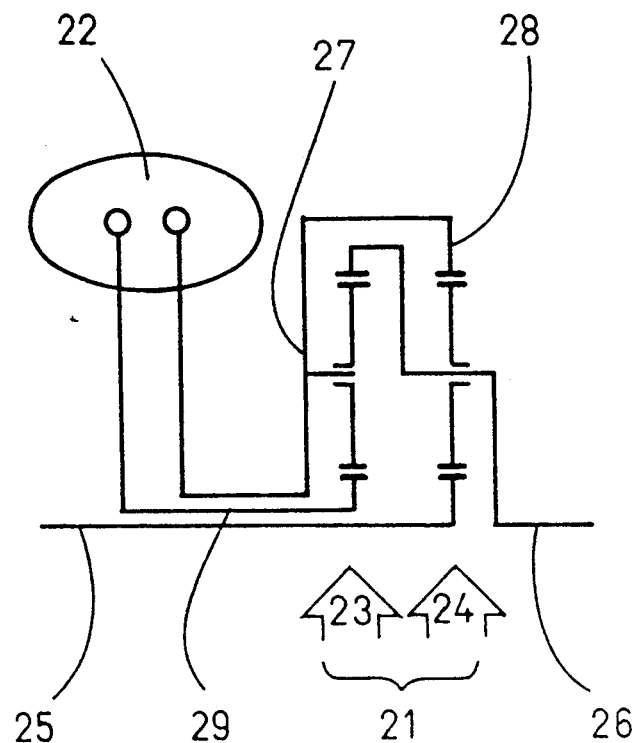
FIG. 4 shows a transmission system comprising a wheel train and a speed regulating device.

Referring to FIG. 4, the transmission system described in the present invention includes a regulating device (22) and a wheel train (21) with two degrees of freedom. The wheel train includes two planet sets, each of them comprises an internal ring gear, a sun gear, a planet carrier and the planet gear rotatingly mounted on the planet carrier thereof. The sun gear (25) of planet set (24) is connected to the driving part of the system. The planet carrier of planet set (24) is connected to the internal ring gear of another planet set (23) and becomes a moving part (26) and is connected to the driven part of the system. Under the stepless speed change condition of the system, connected to ring gear (28) of planet set (24), planet carrier (27) of planet set (23) forms a moving part, while the sun gear (29) of planet set (23) and moving part (27), acting as adjusted elements, are separately connected to the two moving parts of the speed regulating device (22). When either part (27) or part (29) rotates separately at zero speed, the branch power in speed regulating device (22) is equal to zero. Under these two conditions, the speed ratios of the transmission system will be power dividing zero points of the speed regulating device (22). It may be proved by well known wheel train calculation methods that both ratios are finite values greater than 1, and the drive is in the same direction.

Figure 5:
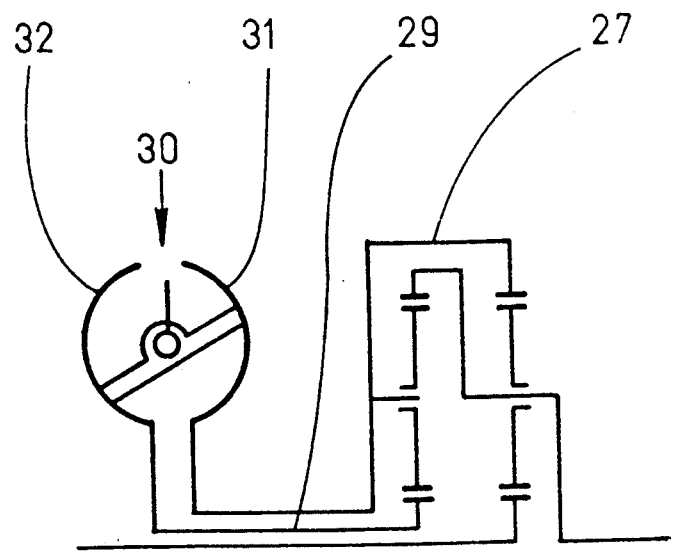
FIG. 5, FIG. 6 and FIG. 7 show a friction stepless speed change device, a hydrodynamic torque converter and a hydraulic transmission device, respectively, which are used as the speed regulating device of the transmission system.

FIG. 5 is one of the transmission systems shown in FIG. 4. The speed regulating device of the system is a friction stepless speed change device (30), which has two friction discs (31), (32) separately connected to the adjusted parts in the wheel train.

Figure 6:
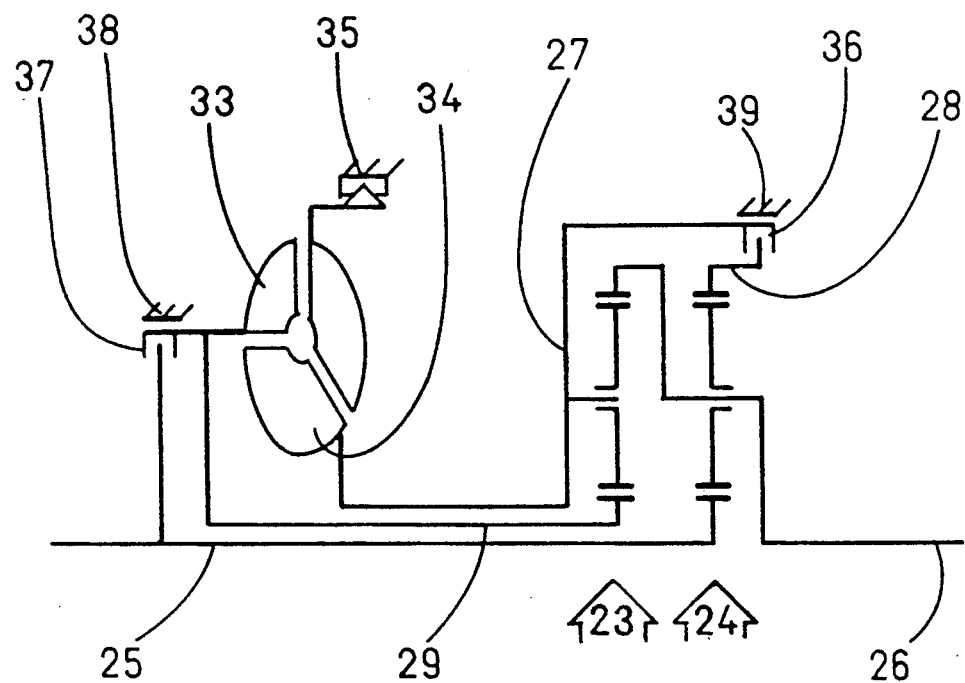

FIG. 6 is one of the transmission systems shown in FIG. 4. The speed regulating device in this system is a hydrodynamic torque converter, which has bladed drive wheels (33) and (39) separately connected to the adjusted elements in the wheel train.

In the aforesaid transmission system, there is a one-way clutch (35) between the hydrodynamic torque converter's reactor and the frame. When the speed ratio of the transmission system changes from a ratio greater than 1 to a smaller one such that the rotational speed of part (29) is approaching that of part (27), the said clutch will disengage to let the reactor float.

In the aforesaid transmission system, there is a clutch (36) between planet carrier (27) of planet set (23) and internal ring gear (28) of planet set (24), a clutch (37) between parts (25) and (29), a brake (38) on part (29) and a brake (39) on part (27). The transmission system can operate in a step speed change manner. The operation method thereof is listed in Table 1. When the transmission system is working in a stepless speed change manner, clutch (36) is engaged and brakes (38) and (39) are disengaged.

Figure 7:
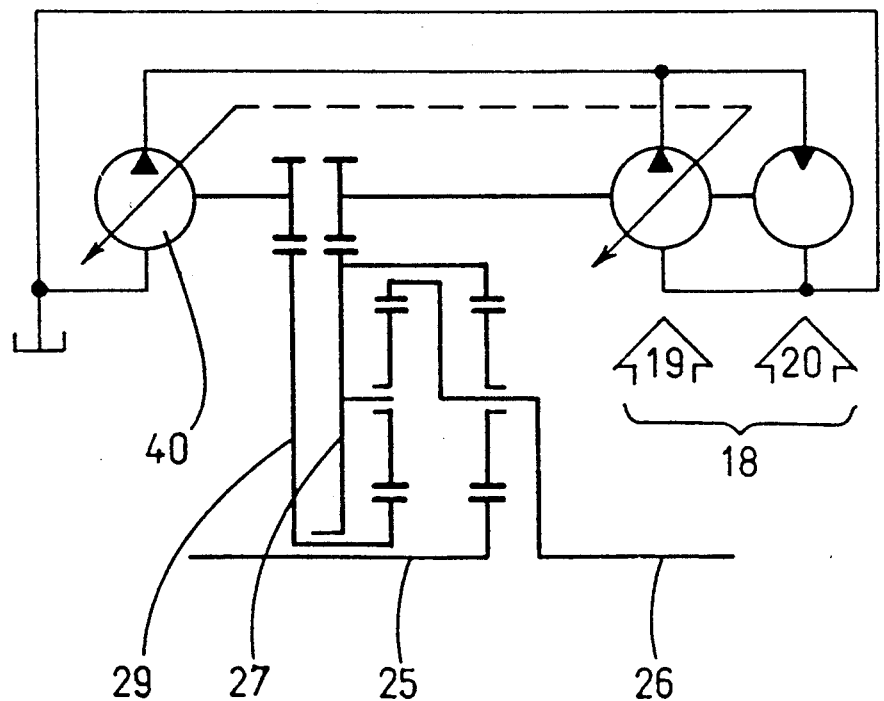

FIG. 7 shows the transmission system shown in FIG. 4, wherein the speed regulating device is a hydraulic speed change transmission device which usually includes the hydraulic circuit with a variable pump and a motor. When the transmission system is working at the power dividing zero point, the flow of the working fluid between the pump and the motor will be zero. Such hydraulic variable motor will malfunction when the displacement is zero or almost zero. To improve the performance of the speed regulating device and the transmission system working at the power dividing zero point and the adjacent speed ratios thereof, a "pump-motor combination" (18) in FIG. 7, includes a variable pump (19) and a motor (20) with their drive shafts connected to each other. The suction port of pump (19) is connected to the outlet of motor (2), while the outlet of pump (19) is connected to the suction port of motor (20). The displacement of this kind of "pump-motor combination" is practically equal to the difference of displacement between pump (19) and motor (20). When the displacement of pump (19) is almost equal to that of motor (20), the displacement of the combination will be zero. Therefore, motor (20) will avoid zero displacement or near zero displacement condition.

As shown FIG. 7, the hydraulic stepless speed change transmission device includes a hydraulic circuit with variable pump (40) and "pump-motor combination" (18) equivalent to a variable motor. The drive shaft of variable pump (40) is connected to part (29) in the wheel train. The "pump-motor combination" (18) includes variable pump (19) and motor (20) and their common shaft is connected to part (27) in the wheel train.

Figure 8:
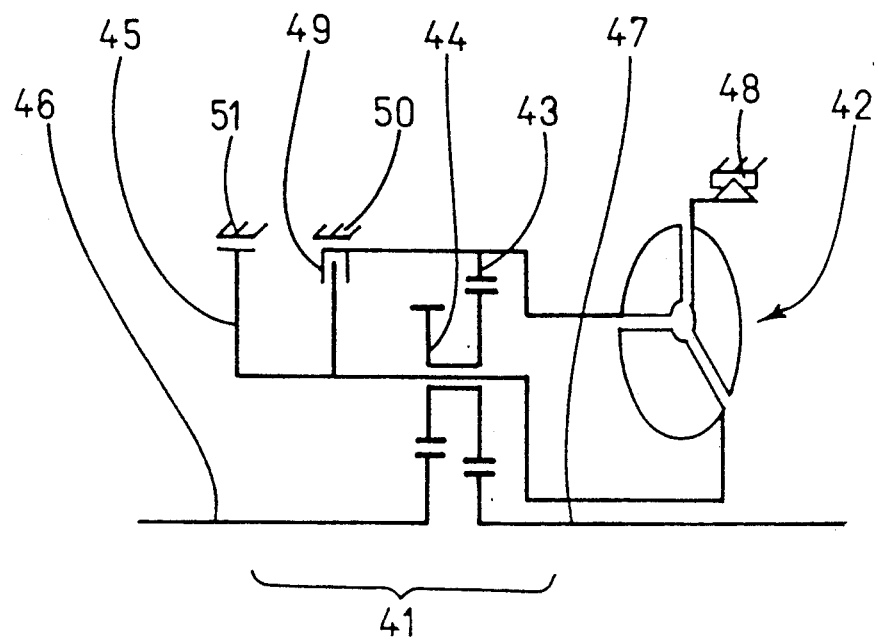
FIG. 8 and FIG. 9, show a transmission system comprising a wheel train a hydrodynamic torque converter respectively.

Referring to FIG. 8, this embodiment includes wheel train (41) and a speed regulating device (42). The wheel train (41) comprises an internal ring gear (43), planet carrier (45), two sun gears (46), (47) and planet gear (44) rotatingly mounted on carrier (45). On the planet gear there are two external ring gears. One of said external ring gears meshes with the internal ring gear (43) and the sun gear (47), and the other one of the external ring gears meshes with sun gear (46). Adjusted parts (43) and (45) are connected respectively to the drive parts of the regulating device (42). The driving part of the system is connected to part (46) and the driven part is connected to part (47).

Being one of the systems set forth by present invention, the structure parameters of the wheel train (41) must be appropriately selected with the well known wheel train calculation method so that when the rotational speed of adjusted parts (43) and (45) respectively is zero, the speed ratios of the transmission system are different non-zero values, and, may be less than 1.

In the aforesaid system, the speed regulating device (42) is a hydrodynamic torque converter, which has two dynamic blade wheels separately connected to adjusted elements (43) and (45). There is a one-way clutch (48) between the reactor and the frame of the hydrodynamic torque converter. When the speed ratio of the system changes from less than one to greater than one such that the rotating speed of part (45) is approaching that of part (43), the one-way clutch will be disengaged to let the reactor float.

Referring to FIG. 8 of the transmission system, there is a clutch (49) between parts (43) and (45), and thereon are brakes (50) and (51). The transmission system is able to work in a step speed change manner and the operation thereof is listed in Table 2. When the transmission system is working in a stepless speed change manner, the clutch (49), brakes (50) and (51) will all be disengaged.

Figure 9:
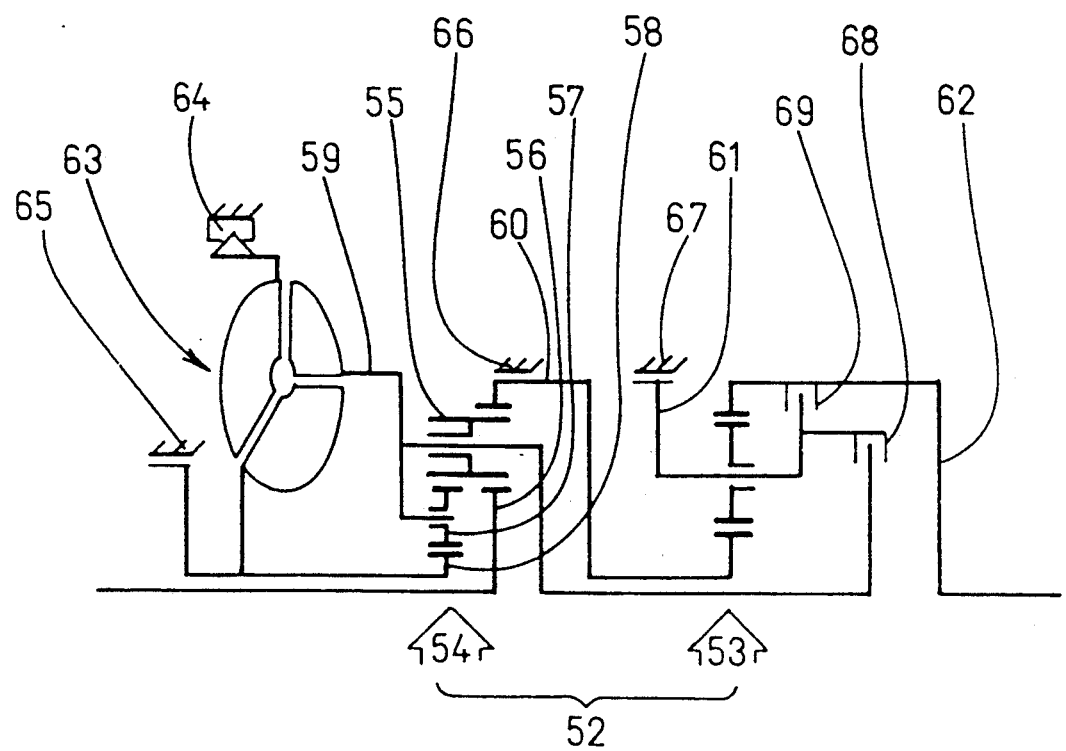

Referring to FIG. 9, a transmission system set forth by the present invention includes a speed regulating device (63) and a wheel train (52), which comprises planet set (53) and planet gear group (54). Planet set (53) comprises a sun gear thereof, and internal ring gear, a planet carrier and planet gear rotatingly mounted on the planet carrier. Planet gear group (54) comprises two sun gears, double planet gears, a planet carrier and an internal ring gear. One planet gear (55) of planet gear group (54) is meshed with sun gear (56) and internal ring gear (60), while another planet gear (57) is meshed with another sun gear (58) and planet gear (55). Planet gears (55) and (57) are all rotatingly mounted on planet carrier (59). The internal ring gear in planet gear group (54), connected to the sun gear of planet set (53), forms a moving part (60). Under the stepless speed change working condition of the said transmission system, the planet carrier (59) of planet gear group (54) connected to planet carrier (61) of planet set (53) forms a moving part. Planet carrier (59) of planet gear group (54) and sun gear (58) acting as adjusted parts are separately connected to the speed regulating device of the said transmission system. The driving part of the said transmission system is connected to part (56) and the driven part is connected to internal ring gear (62) of planet set (53). By using the well known wheel train calculation method, the proper selection of construction parameters of the said wheel train results such that, when speeds of adjusted elements (59) and (58) thereof are separately at zero, the ratios of said transmission system are different finite values greater than 1.

Referring to FIG. 9, speed regulating device (63) is a hydrodynamic torque converter, which has two dynamic blade wheels separatelY connected to adjusted pats (59) and (58). There is a one-way clutch (64) between the startor and the frame of the hydrodynamic torque converter. When the speed ratio of the transmission system changes from a ratio greater than one to less thansmaller one such that when the speed of part (52) is approaching that of part (58), the one-way clutch will be disengaged to let the stator float.

Referring to FIG. 9 in the aforesaid transmission system, there are brakes (65), (66) and (67) separately on parts (58), (60) and (61), a clutch (68) between parts (59) and (61), and a clutch (69) between parts (62) and (61).

The transmission system can work in a step speed change manner and the operation method thereof is listed in Table 3. When the said transmission system is working in a stepless speed change manner, clutch (68) is closed and all other clutches and brakes are disengaged.

Figure 10:
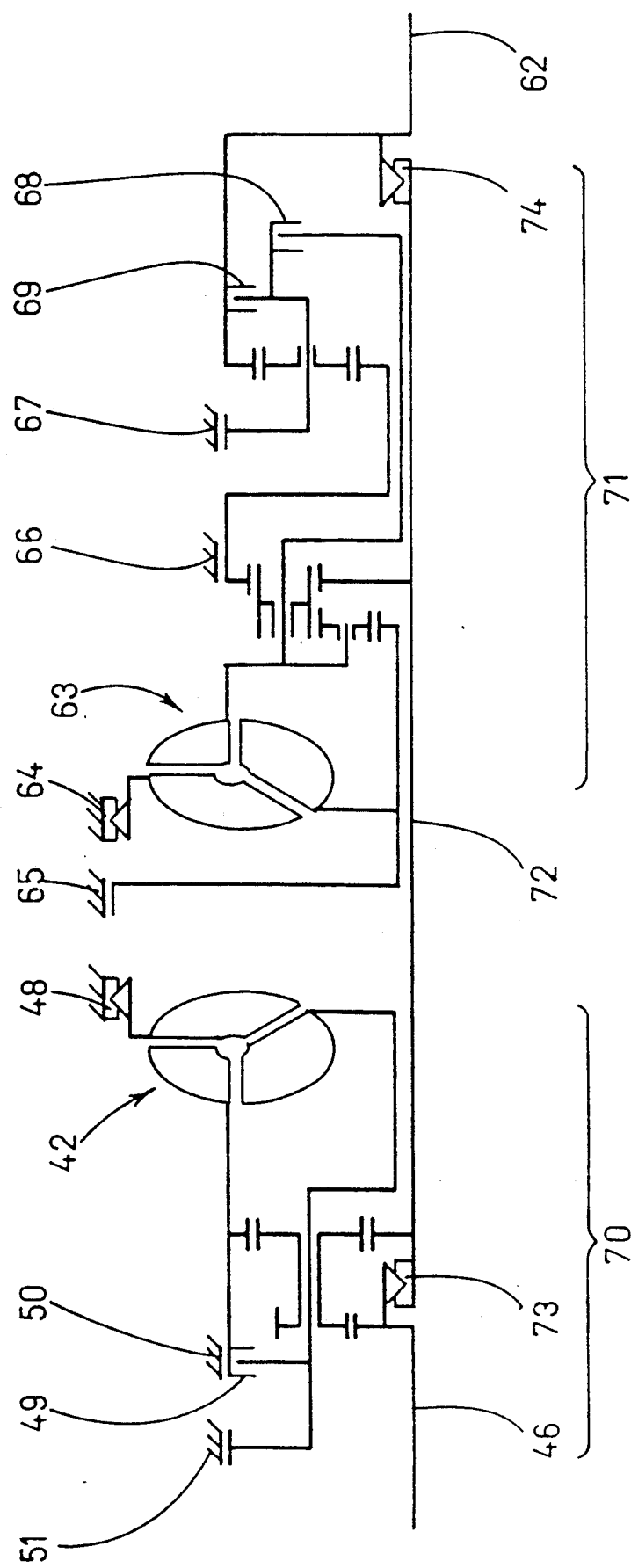
FIG. 10 depicts a transmission system comprising the present invented transmission system serially connected to another stepless speed change transmission system

Referring to FIG. 10, there is shown a transmission system as set forth by the present invention comprising two serially connected transmission systems (70) and (71), shown respectively in FIG. 8 and FIG. 9. For convenience, apart from a few specified arts, each part in FIG. 10 is numbered according to each corresponding number in FIG. 8 and FIG. 9.

As shown in FIG. 10, the transmission system is formed by connecting driven part (47) of transmission system (70) to driving part (56) of transmission system (71), thus becoming a moving part (72). The wheel train of the said system is also formed by wheel trains of the systems shown by FIG. 8 and FIG. 9 in a serial connection, and the speed regulating devices thereof are hydrodynamic torque converters (42) and (63).

To avoid excessive loss of the total power in both the hydrodynamic torque converters, a one-way clutch (73) is set up between driving part (46) and part (72) in the transmission system shown by FIG. 10, and also a one-way clutch (74) is set up between the part (72) and driven part (62), so that the part (72) is always connected to the faster one of the driving part and driven part. When the ratio of said transmission system is greater than 1, the one-way clutch (73) is engaged, the one-way clutch (74) as well as the one-way clutch (48) of torque convertor (42) is disengaged and the reactor of torque converter (42) becomes floating. The speed ratio of said transmission system is varied by convertor (63) only. When the speed ratio of the transmission system is less than 1, the one-way clutch (74) is engaged, the one-way clutch (73) as well as one-way clutch (64) of torque convertor (63) is disengaged and the reactor of torque convertor (63) becomes floating. Thus the speed ratio of the transmission system is varied by torque converter (42) only.

Each of system (70) and system (71) in the transmission system, has the complete set of clutches and brakes in the transmission system shown in FIG. 8 and FIG. 9. The transmission system can operate in a step speed change manner, one of the operation methods thereof is shown in Table 4. When the said transmission system is working in a stepless speed change manner, clutch (68) is closed, and all other brakes and clutches are disengaged.

In the following charts, only clutches and brakes necessary to be engaged under each operation condition are listed. The disengaged clutches, brakes and one-way clutches are not listed.

TABLE 1

| Speed No. | 1 | 2 | 3 | −1 |
|---|---|---|---|---|
| Engaged | 36 | 36 | 36 | 36 |
| Elements | 39 | 38 | 37 | 37 |

TABLE 2

| Speed No. | 1 | 2 | 3 |
|---|---|---|---|
| Engaged Elements | 49 | 50 | 51 |

TABLE 3

| Speed No. | 1 | 2 | 3 | 4 | −1 |
|---|---|---|---|---|---|
| Engaged | 68 | 68 | 68 | 68 | 67 |
| Elements | 67 | 66 | 65 | 69 | 65 |

TABLE 4

| Speed No. | 1 | 2 | 3 | 4 | 5 | 6 |
|---|---|---|---|---|---|---|
| Engaged | 68 | 68 | 68 | 68 | 68 | 68 |
|  | 67 | 67 | 67 | 65 | 65 | 65 |
| Elements | 49 | 50 | 51 | 49 | 50 | 51 |

TABLE 5

| Speed No. | 7 | 8 | 9 | −1 | −2 | −3 |
|---|---|---|---|---|---|---|
| Engaged | 68 | 68 | 68 | 67 | 67 | 67 |
|  | 69 | 69 | 69 | 65 | 65 | 65 |
| Elements | 49 | 50 | 51 | 49 | 50 | 51 |

What is claimed is:

1. A powe dividing transmission system adapted to transmit mechanical power in a stepless speed change manner, comprising:
   a driving part;
   a driven part;
   a multi-freedom mechanism including a part connected to said driving part, a part connected to said driven part, and at least two other reciprocally independent moving parts;
   at least a stepless speed change device adapted to act as a regulating device for the system having drive parts respectively connected to said two moving parts in said multi-freedom mechanism, such that when said device is acting as a regulating device for the system and said two moving parts are respectively static, the speed ratios of the system are two different non-zero finite values in a same drive direction.

2. A power dividing transmission system as claimed in claim 1, comprising one said stepless speed change device and said multi-freedom mechanism with two degrees of freedom thereof.

3. A stepless speed change transmission system as claimed in claim 31 including two serially connected power dividing transmission systems, each of said transmission systems having an individual driving part and driven part, wherein the driven part of the first of said transmission systems is connected to the driving part of the second of said transmission systems, where at least one of the two said transmission systems is said power dividing stepless speed change transmission system.

4. A transmission system as claimed in claim 3, further comprising a first one-way clutch between the driving part and driven part of the first said transmission system, said first one-way clutch being disengaged when the speed ratio of the first said transmission system is less than one, and a second one-way clutch between the driving part and the driven part of the second said transmission system, said second one-way clutch being disengaged when the speed ratio of the second transmission system is greater than one.

5. A power dividing stepless speed change transmission system comprising a driving part; a driven part; a stepless speed change device having a plurality of drive-parts; and a wheel train comprising two planet sets, each of said plane sets having a sun gear, an internal ring gear, a planet carrier and the planet gear rotatingly mounted on said plane carrier; said driving part being connected to the sun gear of the second planet set, the planet carrier of the second planet set being connected to said driven part and the internal ring gear of the first planet set, the planet carrier of the first planet set being able to be connected to the internal ring gear of the second planet set, the sun gear and the planet carrier of the first planet set being separately connected to the drive parts of said device, further comprising a clutch between the planet carrier of the first planet set and the internal ring gear of the second planet set, a clutch between the sun gear of the first planet set and the driving part, and a brake on the sun gear and planet carrier of the first planet set, respectively.

6. A power dividing stepless speed change transmission system including a driving part; a driven part; one stepless speed change device having drive parts; and one wheel train comprising an internal ring gear, a planet carrier, two sun gears and the planet gear with two external ring gears and being rotatingly mounted on said planet carrier, the first of said two sun gears meshing with the first of said external ring gears and being connected to the said driving part, the second sun gear meshing with the second external ring gear and being connected to said driven part, the planet carrier and the internal ring gear which is meshing with the second external ring gear being respectively connected to the drive parts of said device.

7. A power dividing stepless speed change transmission system including a driving part; a driven part; one stepless speed change device having drive parts; and one wheel train, said wheel train including one planet set and one planet gear group; said planet set having a sun gear, an internal ring gear, a planet carrier and the planet gear rotatingly mounted on said planet carrier thereof; said planet gear group having an internal ring gear, a planet carrier, two groups of planet gears rotatingly mounted onthe planet carrier thereof, and two sun gears; the first group of planet gears of the planet gear group being meshed with the internal ring gear and the first sun gear; the second group of plane gears being meshed with the first group of planet gears and the second sun gear; the planet carrier of the planet gear group being able to be connected to the planet carrier of the planet set; the internal ring gear of the planet gear group being connected to the sun gear of the planet set; the planet carrier of the planet gear group and the second said sun gear being respectively connected to the drive parts of said device; the first sun gear being connected to the driving part and the internal ring gear of said planet gear set being connected to said driven part.

8. A transmission system as claimed in claim 7, further comprising a clutch between the carrier of said planet gear group and the carrier of said planet set; a clutch between the internal ring gear and the carrier of the planet set; a respective brake on the internal ring gear and the second sun gear of the planet gear group; a brake on the planet carrier of said planet ste.

* * * * *

UNITED STATES PATENT AND TRADEMARK OFFICE
CERTIFICATE OF CORRECTION

PATENT NO. : 5,030,178
DATED : 7/9/91
INVENTOR(S) : Ming-Luen

It is certified that error appears in the above-identified patent and that said Letters Patent is hereby corrected as shown below:

On the Title page,

| | | |
|---|---|---|
| [76] Inventor | delete "Law Ming-Luen" | insert --Law Ming-Yuen-- |
| [19] United States Patent | delete "Ming-Luen" | insert --Ming-Yuen-- |
| [30] Foreign Application Priority Data | | |
| | delete "China...8710766" | insert --China...87107664-- |
| [57] Abstract, line 11 | after "system" | insert --consists-- |
| col. 01, line 62 | delete "regulatinq" | insert --regulating-- |
| col. 02, line 50 | delete "$\dfrac{\sqrt{R-1}}{\sqrt{R+1}}$" | insert --$\dfrac{\sqrt{R}-1}{\sqrt{R}+1}$-- |
| col. 03, line 06 | delete "requlating" | insert --regulating-- |
| col. 03, line 31 | after "train" | insert --and-- |
| col. 03, line 35 | after "system" | insert --.-- |
| col. 04, line 29 | delete "a,t" | insert --at-- |
| col. 05, line 36 | delete "motor (2)" | insert --motor (20)-- |
| col. 06, line 57 | delete "separatelY" | insert --separately-- |
| col. 07, line 11 | delete "arts" | insert --parts-- |
| col. 08, line 22 | delete "powe" | insert --power-- |

UNITED STATES PATENT AND TRADEMARK OFFICE
CERTIFICATE OF CORRECTION

PATENT NO.   : 5,030,178
DATED        : 7/9/91
INVENTOR(S)  : Ming-Luen

It is certified that error appears in the above-identified patent and that said Letters Patent is hereby corrected as shown below:

| | | |
|---|---|---|
| col. 01, line 53 | after "coupling" | insert --,-- |
| col. 02, line 37 | delete "loss,." | insert --loss,-- |
| col. 04, line 14 | delete "(10" | insert --(10)-- |
| col. 05, line 02 | delete "(39)" | insert --(34)-- |
| col. 05, line 45 | after "shown" | insert --in-- |
| col. 06, line 58 | delete "pats" | insert --parts-- |
| col. 06, line 59 | delete "startor" | insert --starter-- |
| col. 06, line 62 | delete "less thansmaller" | insert --a smaller-- |
| col. 06, line 64 | delete "stator" | insert --starter-- |
| col. 08, line 14 | delete "TABLE 5" | |

UNITED STATES PATENT AND TRADEMARK OFFICE
CERTIFICATE OF CORRECTION

PATENT NO. : 5,030,178
DATED : 7/9/91
INVENTOR(S) : Ming-Luen

It is certified that error appears in the above-identified patent and that said Letters Patent is hereby corrected as shown below:

| | | |
|---|---|---|
| col. 09, line 01 | delete "plane" | insert --planet-- |
| col. 09, line 28 | delete "device." | insert -- device, further comprising brakes on the internal ring gear and the planet carrier of said gear train and a clutch between the internal ring gear and the planet carrier.-- |
| col. 10, line 08 | delete "onthe" | insert --on the-- |
| col. 10, line 11 | delete "plane" | insert --planet-- |
| col. 10, line 28 | delete "ste" | insert --set-- |

Signed and Sealed this

Twenty-fifth Day of May, 1993

Attest:

MICHAEL K. KIRK

*Attesting Officer*  *Acting Commissioner of Patents and Trademarks*

UNITED STATES PATENT AND TRADEMARK OFFICE
CERTIFICATE OF CORRECTION

PATENT NO. : 5,030,178                              Page 1 of 3
DATED     : 7/9/91
INVENTOR(S) : Ming-Luen It is certified that error appears in the above-indentified patent and that said Letters Patent is hereby corrected as shown below:

On the Title page,

| | | |
|---|---|---|
| [76] Inventor | delete "Law Ming-Luen" | insert --Law Ming-Yuen-- |
| [19] United States Patent | delete "Ming-Luen" | insert --Ming-Yuen-- |
| [30] Foreign Application Priority Data | | |
| | delete "China...8710766" | insert --China...87107664-- |
| [57] Abstract, line 11 | after "system" | insert --consists-- |
| col. 01, line 62 | delete "regulatinq" | insert --regulating-- |
| col. 02, line 50 | delete "$\frac{\sqrt{R-1}}{\sqrt{R+1}}$" | insert --$\frac{\sqrt{R-1}}{\sqrt{R+1}}$-- |
| col. 03, line 06 | delete "requlating" | insert --regulating-- |
| col. 03, line 31 | after "train" | insert --and-- |
| col. 03, line 35 | after "system" | insert --.-- |
| col. 04, line 29 | delete "a,t" | insert --at-- |
| col. 05, line 36 | delete "motor (2)" | insert --motor (20)-- |
| col. 06, line 57 | delete "separatelY" | insert --separately-- |
| col. 07, line 11 | delete "arts" | insert --parts-- |
| col. 08, line 22 | delete "powe" | insert --power-- |

UNITED STATES PATENT AND TRADEMARK OFFICE
CERTIFICATE OF CORRECTION

PATENT NO. : 5,030,178

DATED : 7/9/91

INVENTOR(S) : Ming-Luen

It is certified that error appears in the above-identified patent and that said Letters Patent is hereby corrected as shown below:

| | | |
|---|---|---|
| col. 01, line 53 | after "coupling" | insert --,-- |
| col. 02, line 37 | delete "loss,." | insert --loss,-- |
| col. 04, line 14 | delete "(10" | insert --(10)-- |
| col. 05, line 02 | delete "(39)" | insert --(34)-- |
| col. 05, line 45 | after "shown" | insert --in-- |
| col. 06, line 58 | delete "pats" | insert --parts-- |
| col. 06, line 59 | delete "startor" | insert --stator-- |
| col. 06, line 62 | delete "less thansmaller" | insert --a smaller-- |
| col. 08, line 14 | delete "TABLE 5" | |

UNITED STATES PATENT AND TRADEMARK OFFICE
CERTIFICATE OF CORRECTION

PATENT NO. : 5,030,178  
DATED : 7/9/91  
INVENTOR(S) : Ming-Luen

Page 3 of 3

It is certified that error appears in the above-identified patent and that said Letters Patent is hereby corrected as shown below:

| | | |
|---|---|---|
| col. 09, line 01 | delete "plane" | insert --planet-- |
| col. 09, line 28 | delete "device." | insert -- device, further comprising brakes on the internal ring gear and the planet carrier of said gear train and a clutch between the internal ring gear and the planet carrier.-- |
| col. 10, line 08 | delete "onthe" | insert --on the-- |
| col. 10, line 11 | delete "plane" | insert --planet-- |
| col. 10, line 28 | delete "ste" | insert --set-- |

This Certificate supersedes Certificate of Correction issued May 25, 1993.

Signed and Sealed this

Third Day of August, 1993

Attest:

MICHAEL K. KIRK

*Attesting Officer*  *Acting Commissioner of Patents and Trademarks*